United States Patent
Yamamoto et al.

(10) Patent No.: US 7,458,790 B2
(45) Date of Patent: Dec. 2, 2008

(54) VACUUM PUMP WITH IMPROVED OIL LUBRICATION

(75) Inventors: Shinya Yamamoto, Kariya (JP); Ryosuke Koshizaka, Kariya (JP); Yuya Izawa, Kariya (JP); Masahiro Inagaki, Kariya (JP); Kentaro Ishihara, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 179 days.

(21) Appl. No.: 11/591,077

(22) Filed: Oct. 31, 2006

(65) Prior Publication Data
US 2007/0098585 A1    May 3, 2007

(30) Foreign Application Priority Data
Nov. 1, 2005    (JP) ............................. 2005-318583

(51) Int. Cl.
*F03C 2/00* (2006.01)
*F04C 2/00* (2006.01)
*F04C 27/02* (2006.01)

(52) U.S. Cl. ........................... 418/88; 418/94; 418/102; 418/201.1; 184/6.16; 184/6.18; 384/462; 384/474

(58) Field of Classification Search ............... 418/88, 418/94, 98, 206.1, 206.7, 206.8, 201.1, 102; 384/462, 474; 184/6.16, 6.18
See application file for complete search history.

(56) References Cited

U.S. PATENT DOCUMENTS

| 5,271,719 A | * | 12/1993 | Abe et al. ...................... 417/26 |
| 5,836,746 A | | 11/1998 | Maruyama et al. |
| 6,688,863 B2 | * | 2/2004 | Hoshino et al. .......... 418/206.8 |

FOREIGN PATENT DOCUMENTS

| FR | 1290239 | * | 3/1962 | |
| GB | 464493 | * | 10/1935 | |
| JP | 03151588 A | * | 6/1991 | ................. 418/88 |
| JP | 04-060193 | | 2/1992 | |
| JP | 04047189 A | * | 2/1992 | ................. 418/94 |
| JP | 05-164076 | | 6/1993 | |
| JP | 06081788 A | * | 3/1994 | ................. 418/94 |
| JP | 10-281089 | | 10/1998 | |

* cited by examiner

*Primary Examiner*—Theresa Trieu
(74) *Attorney, Agent, or Firm*—Morgan & Finnegan, LLP

(57) ABSTRACT

A vacuum pump includes a housing assembly having an oil-reservoir chamber in which a lubricating oil is stored; a pair of screw rotors disposed in the housing assembly and engaged with each other; a pair of rotary shafts connected to the rotors, respectively; a plurality of bearings supporting each of the rotary shafts and having an opening; an oil-feed pump for feeding the lubricating oil from the oil-reservoir chamber to the bearing; an oil-circulation passage provided for circulating the lubricating oil from the oil-feed pump to the oil-reservoir chamber through the bearing; a cover provided at the opening of the bearing to close the opening of the bearing with a clearance remained, the cover permitting the lubricating oil to enter the bearing through the clearance; and an oil-escape passage provided adjacent to the bearing for returning to the oil-reservoir chamber the lubricating oil not entering the bearing.

11 Claims, 6 Drawing Sheets

VACUUM PUMP WITH IMPROVED OIL LUBRICATION

BACKGROUND OF THE INVENTION

The present invention relates to a vacuum pump, for example, for use in semiconductor manufacturing process.

As a vacuum pump for use in semiconductor manufacturing equipment, a screw vacuum pump is disclosed in Japanese Patent Application Publication No. 5-164076 (cf. Pages 3-5 and FIG. 1). The screw vacuum pump has a pair of screw rotors (20 and 21) disposed in a rotor housing (11). The rotors (20 and 21) are mounted on rotor shafts (24 and 25) which are supported by a gear casing (12), respectively. When the rotor shafts (24 and 25) are rotated, the vacuum pump sucks thereinto air from outside of the screw vacuum pump, compresses it and discharges the compressed air to outside of the screw vacuum pump. The rotor shaft (24) is supported by two roller bearings (30 and 31). The bearing (30) is disposed in the cylindrical portion (33) of the gear casing (12), and the bearing (31) is supported by the lower receiving portion of the gear casing (12). Similarly, the rotor shaft (25) of the rotor (21) is supported by the gear casing (12).

The oil pan of a lower casing (12B) stores therein a lubricating oil in which the lower ends of the rotor shafts (24 and 25) are immersed. The rotor shafts (24 and 25) have therein oil-feed holes (51 and 52) extending axially from the lower end to the middle of the rotor shafts (24 and 25). The oil-feed holes (51 and 52) have outlet ports located at a position corresponding to the bearing (30) for the rotor shaft (24) and the bearing for the rotor shaft (25), respectively. Oil-return holes (53) are formed in the cylindrical portion (33) adjacent to the outer peripheries of the bearings which support the rotary shafts (24 and 25). The oil-return holes (53) lead to the oil pan.

In the above vacuum pump, as the rotor shafts (24 and 25) are rotated, the lubricating oil stored in the oil pan is introduced through the oil-feed holes (51 and 52) of the rotor shafts (24 and 25) to the bearing (30) for the rotor shaft (24) and the bearing for the rotor shaft (25). In view of the structure shown in the drawings, although not expressly mentioned in the above-cited publication, the lubricating oil may pass as follows. Of the lubricating oil fed to the bearings, a part of the lubricating oil enters the bearings and the rest of the lubricating oil flows to the oil-return holes (53). The lubricating oil in the bearings returns to the oil pan through the clearance between the rotor shafts (24 and 25) and the gear casing (12) after lubricating and cooling the bearings. The lubricating oil flowing to the oil-return holes (53) returns to the oil pan through the oil-return holes (53).

According to the prior art vacuum pump disclosed in the above cited publication, while a part of the lubricating oil fed to the bearing (30) through the oil-feed holes (51 and 52) flows to the oil-return hole 53, the remaining substantial amount of the lubricating oil does not flow to the oil-return hole 53 but tends to remain on the bearing (30). The lubricating oil remaining on the bearing (30) directly enters the bearing (30) through the upper opening of the bearing (30) adjacent to the outlet ports of the oil-feed holes (51 and 52). The lubricating oil also tends to remain inside the bearing (30). Thus, the lubricating oil is agitated in the bearing (30) thereby to generate shearing heat in the bearing (30). This results in an increase in the drive torque and temperature of the rotary shafts (24 and 25). It is noted that the numerals in parentheses above correspond to the reference numerals used in the above-cited publication.

The present invention which has been made in view of the above-described problems is directed to a vacuum pump which appropriately feeds a lubricating oil to a bearing thereby to improve lubrication and cooling of the bearing and a rotary shaft.

SUMMARY OF THE INVENTION

According to the present invention, a vacuum pump includes a housing assembly having an oil-reservoir chamber in which a lubricating oil is stored; a pair of screw rotors disposed in the housing assembly and engaged with each other; a pair of rotary shafts connected to the rotors, respectively; a plurality of bearings supporting each of the rotary shafts and having an opening; an oil-feed pump for feeding the lubricating oil from the oil-reservoir chamber to the bearing; an oil-circulation passage provided for circulating the lubricating oil from the oil-feed pump to the oil-reservoir chamber through the bearing; a cover provided at the opening of the bearing to close the opening of the bearing with a clearance remained, the cover permitting the lubricating oil to enter the bearing through the clearance; and an oil-escape passage provided adjacent to the bearing for returning to the oil-reservoir chamber the lubricating oil not entering the bearing.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
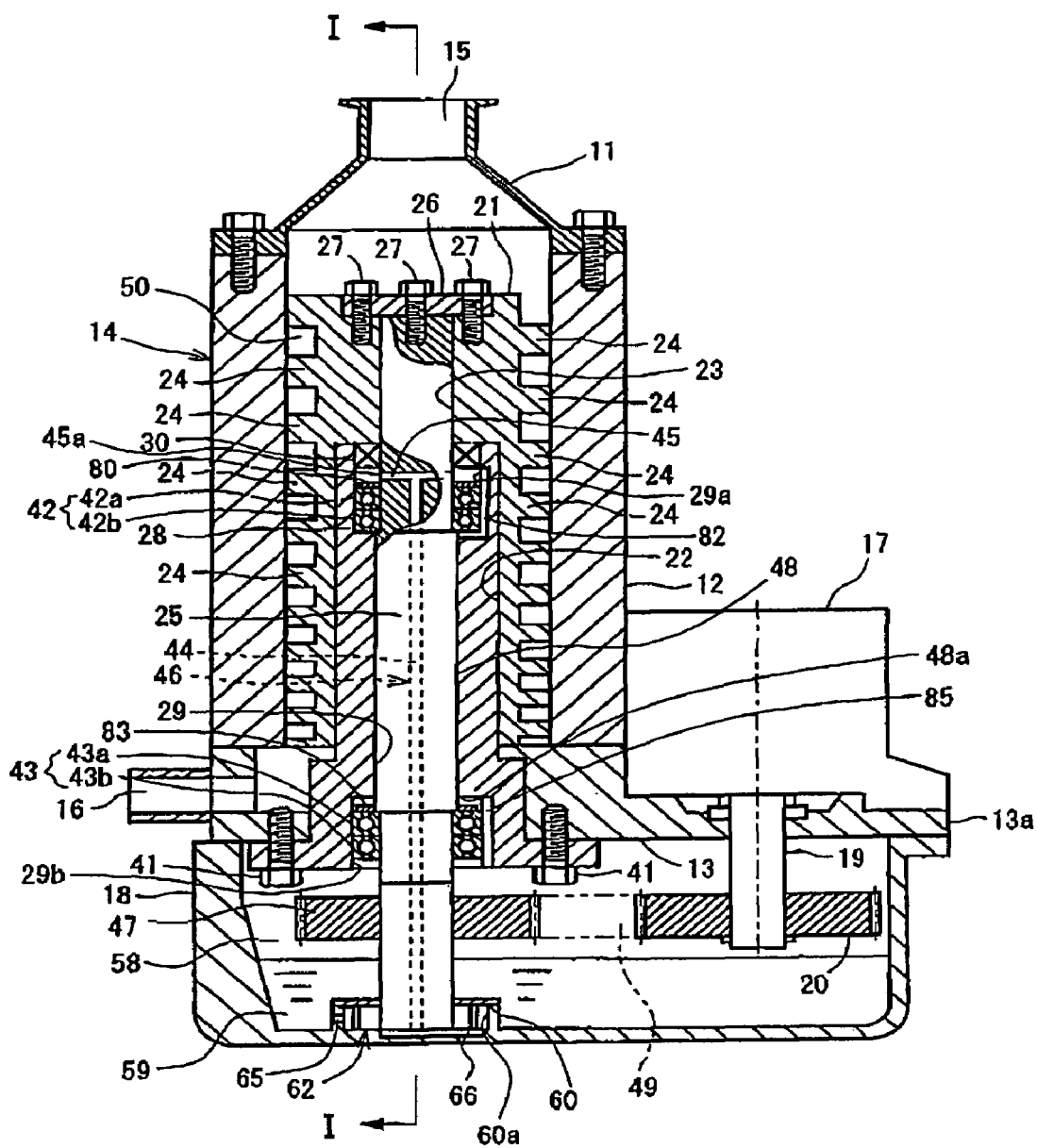
FIG. 1 is a longitudinal cross-sectional view of a vacuum pump according to a first preferred embodiment of the present invention.

The following will describe a vacuum pump according to a first preferred embodiment of the present invention with reference to FIGS. 1 through 3B. The vacuum pump of the first preferred embodiment is a vertical-type screw vacuum pump (hereinafter referred to merely as vacuum pump) as shown in FIG. 1.

Referring to FIG. 1, the vacuum pump has a housing 14 as an outer shell including an upper housing 11, a rotor housing 12 and a lower housing 13. More specifically, the upper and lower housings 11 and 13 are joined to the upper and lower ends of the rotor housing 12, respectively. The upper housing 11 has an inlet 15 which is in communication with the inside of the housing 14 and through which compressible fluid is sucked into the vacuum pump. The lower housing 13 has an outlet 16 which is in communication with the inside of the housing 14 and through which the compressible fluid is discharged out of the vacuum pump. The lower housing 13 has an extension 13a projecting laterally therefrom and located opposite the outlet 16. A drive motor 17 as a drive source is provided on the extension 13a. A gear case 18 is joined to the lower end of the lower housing 13 including the lower end of the extension 13a. The housing 14 and the gear case 18 constitute a housing assembly of the present invention.

Figure 2:
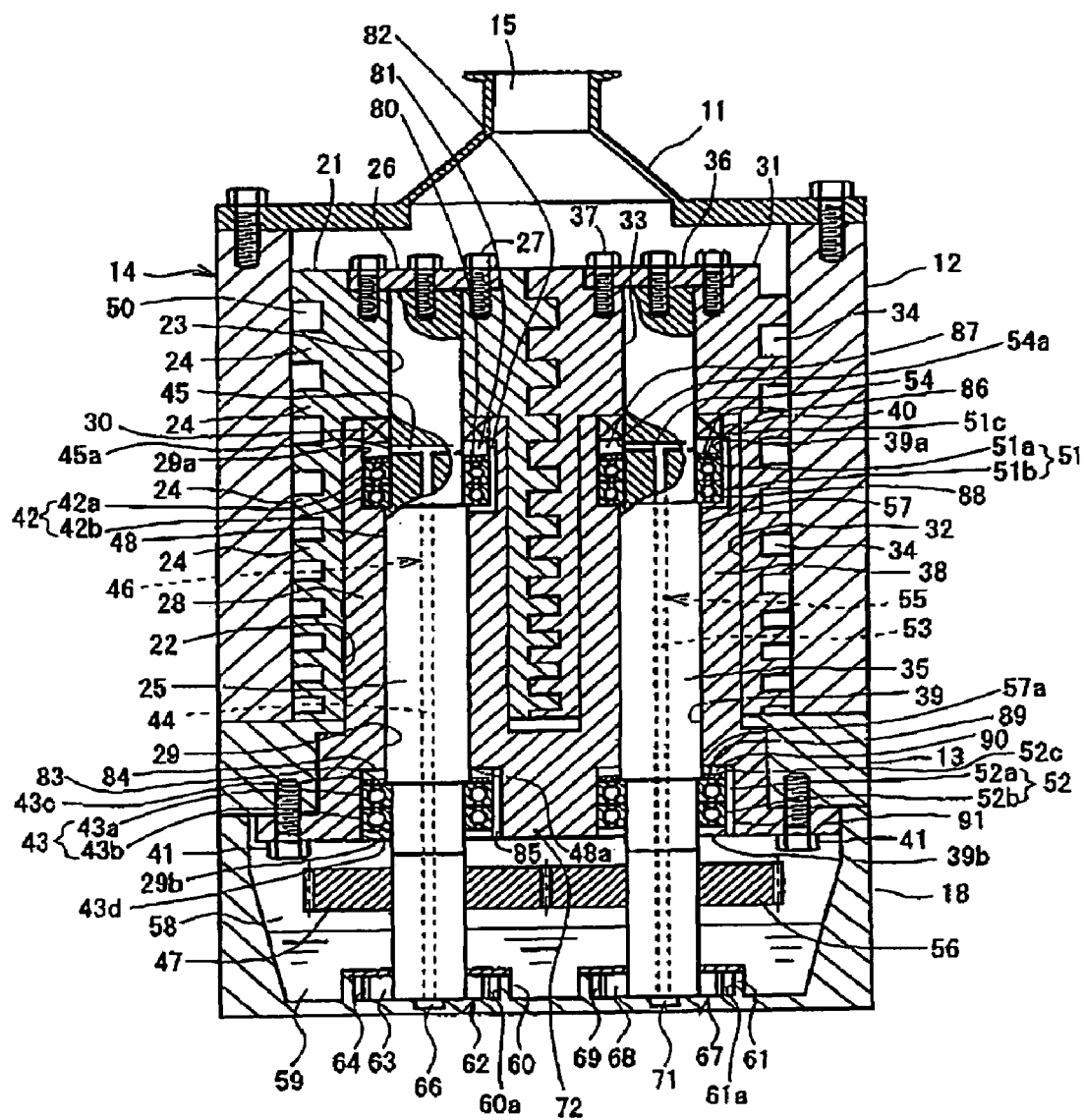
FIG. 2 is a cross-sectional view of the vacuum pump taken along the line I-I in FIG. 1.

Referring to FIG. 2, a screw male rotor 21 and a screw female rotor 31 are accommodated in the housing 14 and engaged with each other. The rotors 21 and 31 and the housing 14 cooperate to define working chambers 50 in a way that is well known in the art. The male rotor 21 has an insertion hole 22 extending axially therein and a connection hole 23 extending axially upward from the insertion hole 22. The connection hole 23 has a diameter smaller than that of the insertion hole 22. A rotary shaft 25 extends through the lower housing 13 and the insertion hole 22 and is inserted in the connection hole 23 of the male rotor 21. The male rotor 21 and the rotary shaft 25 are connected to each other by a plate 26 and bolts 27, as shown in FIG. 2. Thus, the male rotor 21 is rotatable with the rotary shaft 25 Similarly, the female rotor 31 has an insertion hole 32 and a connection hole 33 and is connected to a rotary shaft 35 by a plate 36 and bolts 37.

A pair of cylindrical shaft supports 28 and 38 is inserted in the insertion holes 22 and 32 of the rotors 21 and 31, respectively, and joined to the lower housing 13. As shown in FIG. 2, the shaft supports 28 and 38 are integrally connected to a base 72 to form an integral unit. In the first preferred embodiment, the shaft supports 28 and 38 are fixed at the base 72 to the lower housing 13 by bolts 41. There is a slight clearance between the outer circumferential surface of the shaft support 28 and the inner circumferential surface of the insertion hole 22 of the male rotor 21. Similarly, a slight clearance is present between the outer circumferential surface of the shaft support 38 and the inner circumferential surface of the insertion hole 32 of the female rotor 31.

The shaft support 28 has at its center a through hole 29 extending axially, through which the rotary shaft 25 on the male rotor 21 side is inserted. Two bearing sets 42 and 43 are provided between the rotary shaft 25 and the shaft support 28 for supporting the rotary shaft 25 at the upper and lower portions of the rotary shaft 25, respectively. In the first preferred embodiment, roller bearings are used for the bearing sets 42 and 43. The shaft support 28 has at its upper end an upper large-diameter hole 29a which is formed in connection with the through hole 29 and has a diameter larger than that of the through hole 29. The bearing set 42 is disposed in the upper large-diameter hole 29a and between the rotary shaft 25 and the shaft support 28. A cover 80, which will be described later in detail, is provided above the bearing set 42 and fixedly fitted on the rotary shaft 25.

A seal member 30 is provided above the bearing set 42 and between the rotary shaft 25 and the shaft support 28. The shaft support 28 has at its lower end a lower large-diameter hole 29b which is formed in connection with the through hole 29 and having a diameter larger than that of the through hole 29. The bearing set 43 is disposed in the lower large-diameter hole 29b and between the rotary shaft 25 and the shaft support 28. A cover 83 is provided above the bearing set 43 and fixedly fitted on the rotary shaft 25.

The bearing sets 42 and 43 are provided for supporting the rotary shaft 25 in such a way that the rotary shaft 25 is rotatable relative to the shaft support 28. In the first preferred embodiment, two single-row roller bearings which are arranged in parallel are used for each of the bearing sets 42, and 43. The arrangement of the bearing sets 42 and 43 provides a slight clearance between the outer circumferential surface of the rotary shaft 25 and the inner circumferential surface of the through hole 29 of the shaft support 28, which clearance forms an oil-recovery passage 48 which will be described later in detail.

The rotary shaft 25 has an axial passage 44 extending along the axis thereof. The axial passage 44 extends from the lower end of the rotary shaft 25 to the position which corresponds to the bearing set 42. The rotary shaft 25 has a lateral passage 45 formed therein and extending horizontally or perpendicularly to the axis of the rotary shaft 25 for connection to the upper end of the axial passage 44. The lateral passage 45 has two outlets 45a which are located above the bearing set 42. The outlets 45a correspond to the outlet of the bearing set 42 side. The axial and lateral passages 44 and 45 comprise an oil-feed passage 46 through which a lubricating oil is fed to the bearing set 42. The oil-feed passage 46 formed in the rotary shaft 25 and the oil-recovery passage 48 formed around the rotary shaft 25 comprise an oil-circulation passage. Oil-escape passages 82 and 85 are provided in the shaft support 28 at positions corresponding to the outer peripheral side of the bearing sets 42 and 43, respectively. Although the shaft support 28, the rotary shaft 25 and the bearing sets 42 and 43 and other parts on the male rotor 21 side have been described so far, elements or parts are provided on the female rotor 31 side which are substantially the same as those on the male rotor 21 side.

The male rotor 21 will be now described. The male rotor 21 has teeth 24 formed therearound and extending helically from its upper end toward its lower end. As shown in FIG. 2, the teeth 24 are formed such that the lead angle thereof decreases progressively toward the lower end of the male motor 21. The female rotor 31 has tooth spaces 34 formed therearound and in a complementary relation to the teeth 24 of the male rotor 21.

The rotary shaft 25 of the male rotor 21 extends through the lower housing 13 and then into the gear case 18. A synchronous gear 47 is mounted on the rotary shaft 25 in the gear case 18. Similarly, the rotary shaft 35 of the female rotor 31 extends through the lower housing 13 and further into the gear case 18. A synchronous gear 56 is mounted on the rotary shaft 35 in the gear case 18 for engagement with the synchronous gear 47.

Referring to FIG. 1, an intermediate gear 49 which is engaged with the synchronous gear 47 is provided in the gear case 18. In the gear case 18, the intermediate gear 49 is engaged with a drive gear 20 mounted on a drive shaft 19 of the drive motor 17. The gear case 18 has an oil-reservoir chamber 58 at its lower end below the synchronous gears 47 and 56 for storing therein a lubricating oil 59.

The gear case 18 has a cylindrical projection 60 extending inwardly from the bottom wall of the gear case 18 and located at the lower end of the rotary shaft 25. The projection 60 has a round hole 60a in which a trochoid pump 62 is disposed for feeding the lubricating oil 59 into the oil-circulation passage of the vacuum pump. The trochoid pump 62 includes an inner rotor 63 and an outer rotor 64. The inner rotor 63 is fixedly fitted on the lower end of the rotary shaft 25 for rotation therewith. The outer rotor 64 is fitted at its outer circumferential surface in the round hole 60a so as to be rotatable therein As the inner rotor 63 is driven to rotate, the outer rotor 64 is rotated therewith and the lubricating oil 59 trapped between the rotating inner and outer rotors 63, 64 is pumped out into the oil-circulation passage.

As shown in FIG. 1, the trochoid pump 62 has an oil-suction port 65 communicating with the oil-reservoir chamber 58, through which the lubricating oil 59 in the oil-reservoir 58 is sucked to the rotors 63 and 64. The trochoid pump 62 also has an oil-discharge port 66 communicating with the oil-feed passage 46 of the rotary shaft 25. The lubricating oil 59 is discharged into the oil-feed passage 46 through the oil-discharge port 66. As shown in FIG. 2, the bottom wall of the gear case 18 below the lower end of the rotary shaft 35 has substantially the same structure as that below the lower end of the rotary shaft 25. A trochoid pump 67 is provided at the lower end of the rotary shaft 35 for feeding the lubricating oil 59 into the oil-circulation passage. The trochoid pump 67 has substantially the same structure as the trochoid pump 62. More specifically, the trochoid pump 67 is disposed in the round hole 61a of the projection 61 of the gear case 18. The trochoid pump 67 includes inner and outer rotors 68 and 69 and an oil-discharge port 71 and an oil-suction port (not shown).

Figure 3A:
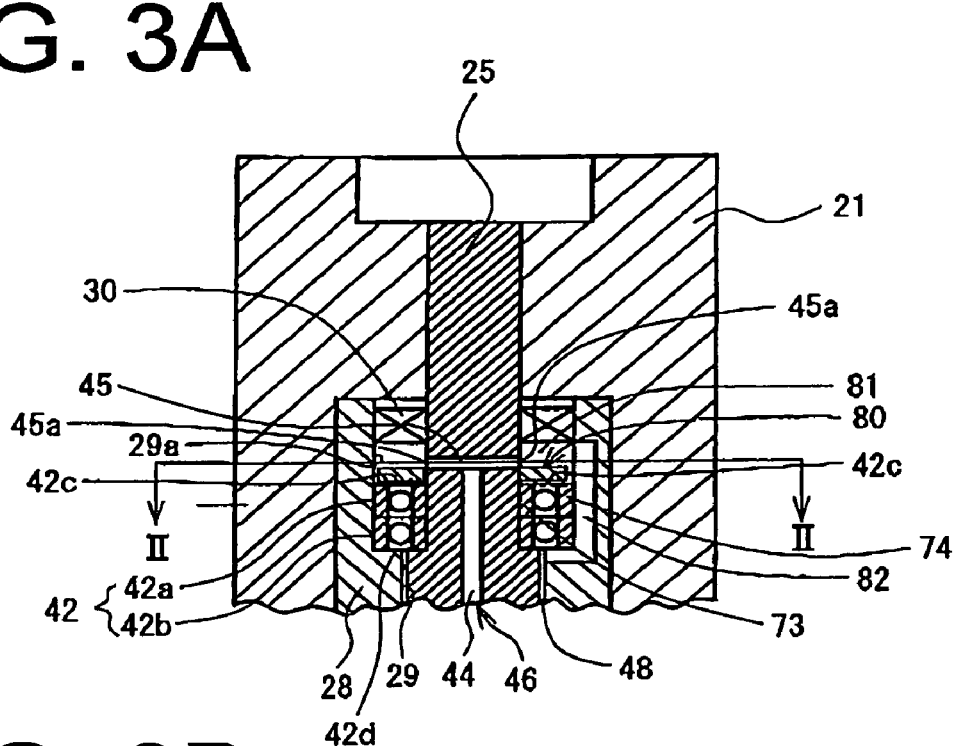
FIG. 3A is a partially enlarged cross-sectional view of the vacuum pump around the cover according to the first preferred embodiment of the present invention.

Referring to FIG. 3A, the bearing set 42 consists of upper and lower bearings 42a and 42b of the same type each including an inner ring 73 an outer ring 74, rolling bodies (balls) and a cage. The rolling bodies and the cage are disposed between the inner and outer rings 73 and 74. The inner ring 73 is fixedly fitted on the rotary shaft 25 for rotation therewith. The outer ring 74 is fixedly fitted in the upper large-diameter hole 29a of the shaft support 28. The bearings 42a and 42b are of non-sealed open type having upper and lower openings 42c and 42d, respectively, through which the rolling bodies are exposed. The upper and lower openings 42c and 42d are formed by the clearance between the inner and outer rings 73 and 74.

The cover 80 is made of a disc-shaped plate having a through hole 80a at its center. The rotary shaft 25 is inserted through and fitted in the through hole 80a of the cover 80 so that the cover 80 is fixed to the rotary shaft 25 for rotation therewith. The cover 80 is located between the outlets 45a of the lateral passage 45 of the rotary shaft 25 adjacent to the bearing set 42 and the upper opening 42c of the upper bearing 42a so that the upper opening 42c of the upper bearing 42a is closed by the cover 80. The outlets 45a of the lateral passage 45 adjacent to the bearing set 42 in this embodiment correspond to the outlet of the oil-feed passage adjacent to the bearing in the present invention. It is noted that the cover 80 closes the upper opening 42c of the upper bearing 42a such that a clearance exists between the cover 80 and the upper bearing 42a. The cover 80 has an outer diameter smaller than the inner diameter of the upper large-diameter hole 29a.

Figure 3B:
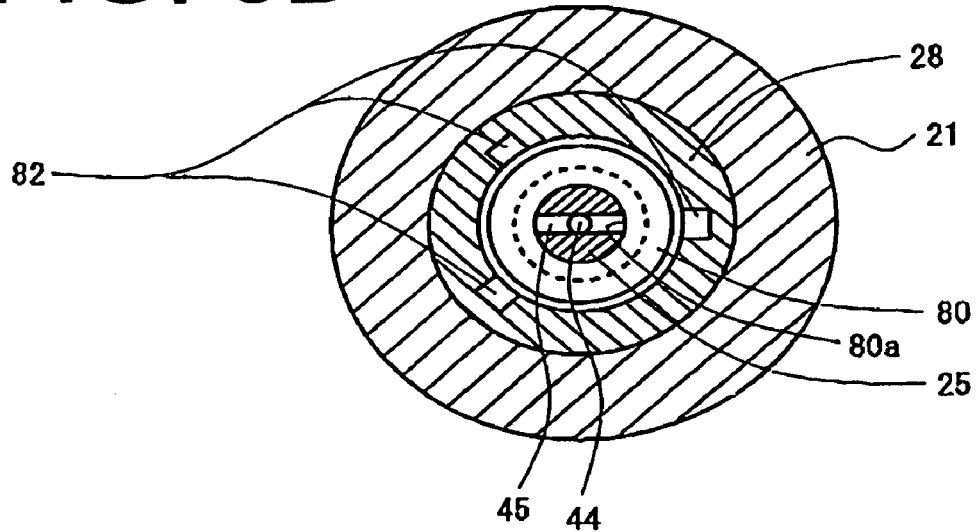
FIG. 3B is a cross-sectional view of the vacuum pump taken along the line I-I in FIG. 3A.

The rotary shaft 25, the upper bearing 42a, the seal member 30 and the inner wall of the upper large-diameter hole 29a cooperate to define an oil-gathering chamber 81. As clearly shown in FIG. 3A, the oil-gathering chamber 81 is located so as to face the outlets 45a of the lateral passage 45. Three oil-escape passages 82 which are formed in the shaft support 28 are located around the bearing set 42 as shown in FIG. 3B. The oil-escape passages 82 provide fluid communication between the oil-gathering chamber 81 and the oil-recovery passage 48 formed by the clearance between the outer circumferential surface of the rotary shaft 25 and the inner circumferential surface of the through hole 29 of the shaft support 28.

The structure around the bearing set 43 is substantially the same as that around the bearing set 42 as shown in FIG. 2. More specifically, the cover 83 is fixedly fitted on the rotary shaft 25 so that the upper opening 43c of the upper bearing 43a of the bearing set 43 is closed by the cover 83. The rotary shaft 25, 20 the upper bearing 43a, the inner wall of the lower large-diameter hole 29b cooperate to define an oil-gathering chamber 84. The oil-escape passages 85 are formed in the shaft support 28 at positions corresponding to the outer peripheral side of the bearing set 43. The oil-escape passages 85 provide fluid communication between the oil-gathering chamber 84 and the oil-reservoir chamber 58. The oil-recovery passage 48 has an outlet 48a adjacent to the bearing set 43. The outlet 48a in this embodiment corresponds to the outlet of the oil-circulation passage adjacent to the bearing in the present invention. The cover 83 is located between the outlet 48a adjacent to the bearing set 43 and the upper opening 43c of the upper bearing 43a (cf. FIG. 2).

The structure around the bearing sets 42 and 43 supporting the rotary shaft 25 on the male rotor 21 side has been described. The structure around bearing sets 51 and 52 supporting the rotary shaft 35 on the female rotor 31 side is substantially the same as that around the bearing sets 42 and 43.

The following will describe the operation of the vacuum pump of the this embodiment. As the drive motor 17 is rotated, the rotating force is transmitted to the synchronous gear 47 though the drive gear 20 and the intermediate gear 49 thereby to rotate the synchronous gear 47. Accordingly, the synchronous gear 56 is rotated synchronously with the synchronous gear 47, and the rotors 21 and 31 are rotated with the rotary shafts 25 and 35. During this rotation, the compressible fluid is sucked into the working chambers 50 through the inlet 15 since the male rotor 21 and the female rotor 31 are engaged with each other through their teeth 24 and tooth spaces 34. The fluid in the working chambers 50 is transferred toward the outlet 16 while being compressed by the rotors 21 and 31, and the compressed fluid is discharged out of the vacuum pump through the outlet 16. When a closed space such as a room, a container or the like is connected to the inlet 15 of the vacuum pump, the closed space is vacuumized by the operation of the vacuum pump.

During the operation of the vacuum pump, the rotary shafts 25 and 35 are rotated at a high speed in the opposite directions. According to the pumping action of the trochoid pump 62, the trochoid pump 62 sucks therein the lubricating oil 59 from the oil-reservoir chamber 58 through the oil-suction port 65 and discharges the lubricating oil 59 through the oil-discharge port 66. The discharged lubricating oil 59 flows into the axial passage 44 of the rotary shaft 25 through its lower end opening which is in communication with the oil-discharge port 66. The lubricating oil 59 flows upward in the axial passage 44, reaches the lateral passage 45 and flows through the outlets 45a into the oil-gathering chamber 81 above the upper bearing set 42.

The lubricating oil 59 which flows into the oil-gathering chamber 81 gathers on the cover 80. All of the lubricating oil 59 gathering on the cover 80 is prevented from entering directly the upper bearing 42a. Since the cover 80 is rotated with the rotary shaft 25 at a high speed, the lubricating oil 59 gathering on the cover 80 is scattered outwardly toward the inner circumferential surface of the shaft support 28 by the centrifugal force. A part of the scattered lubricating oil 59 enters the inside of the upper and lower bearings 42a and 42b through the clearance between the cover 80 and the upper bearing 42a and the upper opening 42c of the upper bearing 42a thereby to cool and lubricate the upper and lower bearings 42a and 42b. The lubricating oil 59 in the lower bearing 42b flows out thereof through its lower opening 42d and then flows downward into the oil-recovery passage 48. The rest of the lubricating oil 59, which does not enter the upper bearing 42a, flows immediately into the oil-recovery passage 48 through the oil-escape passages 82 provided around the upper and lower 10 bearings 42a and 42b.

The lubricating oil 59 flows downward in the oil-recovery passage 48 while cooling the rotary shaft 25 and the shaft support 28. Then, the lubricating oil 59 flows into the oil-gathering chamber 84 located above the bearing set 43 in communication with the oil-recovery passage 48. The lubricating oil 59 in the oil-gathering chamber 84 gathers on the cover 83. All of the lubricating oil 59 gathering on the cover 83 is prevented from entering directly the upper bearing 43a. Since the cover 83 is fixed to the rotary shaft 25 for rotation therewith at a high speed, the lubricating oil 59 on the cover 83 is scattered outwardly toward the inner circumferential surface of the shaft support 28 by the centrifugal force. A part of the scattered lubricating oil 59 enters the inside of the upper bearing 43a through the clearance between the cover 83 and the upper bearing 43b and the upper opening 43c of the upper bearing 43a thereby to cool and lubricate the upper and lower bearings 43a and 43b. The lubricating oil 59 in the lower bearing 43b flows out thereof through its lower opening 43d and then is collected in the oil-reservoir chamber 58 in the gear case 18.

The rest of the lubricating oil 59, which does not enter the upper and lower bearings 43a and 43b, is collected in the oil-reservoir chamber 58 through the oil-escape passages 85. Before collected in the oil-reservoir chamber 58, part of the lubricating oil 59 may flows via the synchronous gear 47 thereby to lubricate the synchronous gear 47. The collected lubricating oil 59 is transferred from the oil-reservoir chamber 58 into the trochoid pump 62 and flows in the same manner as described above.

The flow of the lubricating oil 59 around the rotary shaft 35 on the female rotor 31 side is substantially the same as that around the rotary shaft 25. More specifically, the lubricating oil 59 is fed into an oil-gathering chamber 87 through an oil-feed passage 55 by the trochoid pump 67. Since a cover 86 is disposed between the outlets 54a of the oil-feed passage 55 adjacent to the bearing set 51 and the upper opening 51c of the bearing set 51, only a part of the lubricating oil 59 enters the bearing set 51 to lubricate and cool the bearing set 51. The rest of the lubricating oil 59 flows into an oil-recovery passage 57 through the oil-escape passage 88. The rotary shaft 35 and the shaft support 38 are cooled by the lubricating oil 59 flowing in the oil-recovery passage 57. The lubricating oil 59 flowing in the oil-recovery passage 57 reaches an oil-gathering chamber 90. Since a cover 89 is disposed between the outlet 57a of the oil-recovery passage 57 and the upper opening 52c of the bearing set 52, only a part of the lubricating oil 59 enters the bearing set 52 to lubricate and cool the bearing set 52 and then is collected in the oil-reservoir chamber 58. The rest of the lubricating oil 59, which does not enter the bearing set 52, is collected in the oil-reservoir chamber 58 through oil-escape passages 91.

Although not described above, the shaft support 38 has a through hole 39 and upper and lower large-diameter holes 39a and 39b, and a seal member 40 is provided on the rotary shaft 35 at a position above the cover 86. Furthermore, the bearing sets 51 and 52 include upper and lower bearings 51a and 51b and upper and lower bearing 52a and 52b, respectively, and the oil-feed passage 55 includes axial and lateral passages 53 and 54.

According to the vacuum pump of the above-described first preferred embodiment, the following advantageous effects are obtained.

(1) The provision of the covers 80 and 86 between the outlets 45a and 54a of the oil-feed passages 46 and 55 adjacent to the bearing sets 42 and 51 and the upper openings 42c and 51c of the upper bearing sets 42 and 51, respectively, prevents all of the lubricating oil 59 flowing to the upper bearings 42a and 51a from entering directly the inside of the upper beatings 42a and 51a through the upper openings 42c and 51c of the upper bearings 42a and 51a, respectively. Thus, the lubricating oil 59 is prevented from remaining in substantial amount in the bearing sets 42 and 51, with the result that the increase in the drive torque and the temperature of the rotary shafts 25 and 35 are prevented.

(2) The provision of the covers 83 and 89 between the outlets 48a and 57a of the oil-recovery passages 48 and 57 adjacent to the bearing sets 43 and 52 and the upper openings 43c and 53c of the upper bearing sets 43 and 52, respectively, prevents all of the lubricating oil 59 flowing to the upper bearings 43a and 52a from entering directly the inside of the upper beatings 43a and 52a through the upper openings 43c and 52c of the upper bearings 43a and 52a. Thus, the lubricating oil 59 is prevented from remaining in substantial amount in the bearing sets 43 and 52, with the result that the increase in the drive torque and the temperature of the rotary shafts 25 and 35 are prevented.

(3) The covers 80, 83, 86 and 89 fixed to the rotary shafts 25 and 35 are rotatable with the rotary shafts 25 and 35 at high a speed, so that the lubricating oil 59 gathering on the covers 80, 83, 86 and 89 is scattered outwardly toward the inner circumferential surfaces of the shaft supports 28 and 38 by the centrifugal force. Then, a part of the lubricating oil 59 flows into the oil-recovery passages 48 and 57 or the oil-reservoir chamber 58 through the oil-escape passages 82, 85, 88 and 91. Thus, the lubricating oil 59 is prevented from remaining on the covers 80, 83, 86 and 89 and tends to flow into the oil-escape passages 82, 85, 88 and 91, so that the lubricating oil 59 is reliably prevented from remaining in substantial amount in the bearings.

(4) A part of the lubricating oil 59 gathering on the covers 80, 83, 86 and 89 enters the inside of the upper bearings 42a, 43a, 51a and 52a through the clearances between the covers 80, 83, 86 and 89 and the upper bearing 42a. 43a, 51a and 52a and the upper openings 42c, 43c, 51c and 52c of the upper bearings 42a, 43a, 51a and 52a, thereby to lubricate and cool the bearing sets 42, 43, 51 and 52. Therefore, the lubricating oil 59 is appropriately fed into the bearing sets 42, 43, 51 and 52, thus improving lubrication and cooling of the rotary shafts 25 and 35 and the bearing sets 42, 43, 51 and 52.

(5) The trochoid pumps 62 and 67 are connected to the rotary shafts 25 and 35 of the male and female rotors 22 and 31, respectively. The trochoid pumps 62 and 67 use the rotation of the rotary shafts 25 and 35 for feeding the lubricating oil 59. Thus, the vacuum pump dispenses with an additional drive source for driving the trochoid pumps 62 and 67, with the result that the vacuum pump of this embodiment reduces the number of its parts and the size.

(6) The lubricating oil 59 circulates through each oil-circulation passage (the oil-feed passages 46 and 55 and the oil-recovery passages 48 and 57) and is collected in the oil-reservoir chamber 58. Before collected in the oil-reservoir chamber 58, part of the lubricating oil 59 may flow via the synchronous gears 47 and 56, thereby lubricating the synchronous gears 47 and 56.

A vacuum pump according to a second preferred embodiment of the present invention will be described with reference to FIGS. 4A and 4B. Although the cover is fixed to the rotary shaft above the opening of the bearing in the first preferred embodiment, a cover is fixedly fitted at its outer periphery above the opening of the bearing in the housing in the second preferred embodiment. In the second preferred embodiment, four covers 101 are also provided above the bearing sets 42, 43, 51 and 52 supporting the rotary shafts 25 and 35, respectively. Each of these covers 101 is substantially the same structure. For the sake of convenience of explanation, therefore, like or same parts or elements are referred to by the same reference numerals as those which have been used in the first preferred embodiment, and the description thereof is omitted. Only the modified portions will be described.

Figure 4A:
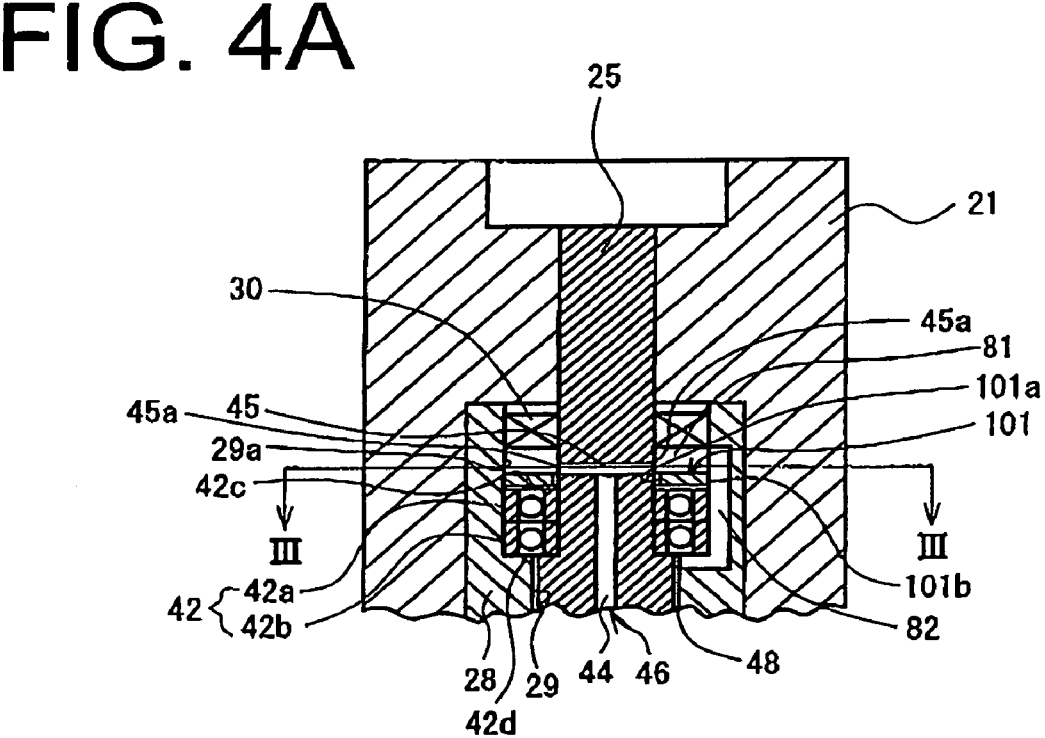
FIG. 4A is a partially enlarged cross-sectional view of a vacuum pump around a cover according to a second preferred embodiment of the present invention.
Figure 4B:
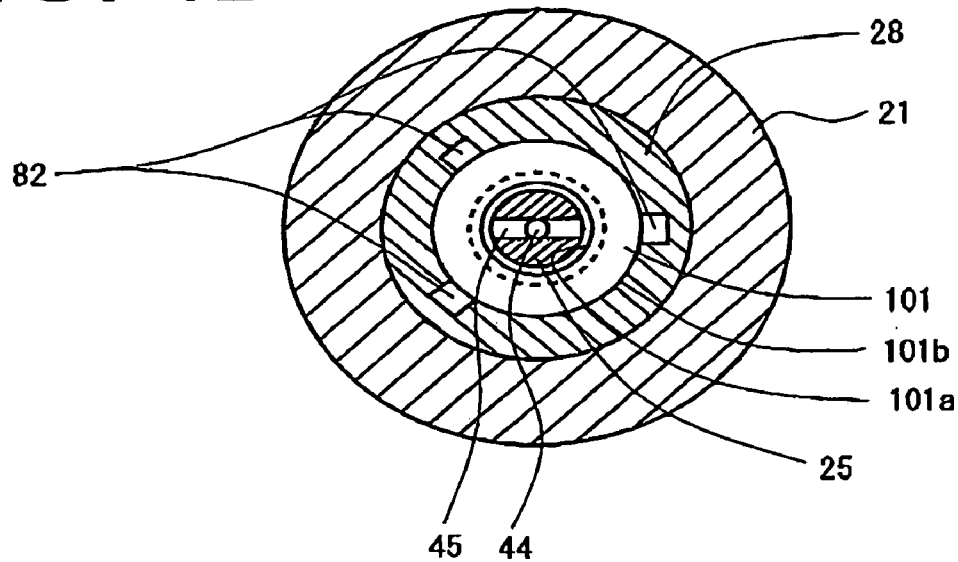
FIG. 4B is a cross-sectional view of the vacuum pump taken along the line III-III in FIG. 4A.

FIGS. 4A and 4B show a structure around the bearing set 42 which supports the rotary shaft 25. The cover 101 is made of a disc-shaped plate having a through hole 101a at its center. The rotary shaft 25 is inserted through the through hole 101a of the cover 101, and the cover 101 is fixedly fitted in the upper large-diameter hole 29a of the shaft support 28. The through hole 101a is formed as an escape hole so that there is a slight clearance between the outer circumferential surface of the rotary shaft 25 and the inner circumferential surface of the through hole 101a. The cover 101 is provided between the outlets 45a of the lateral passage 45 of the oil-feed passage 46 adjacent to the bearing set 42 and the upper opening 42c of the upper bearing 42a so that the cover 101 closes the upper opening 42c of the upper bearing 42a. The structure around the bearing set 43 is substantially the same as that of the first preferred embodiment except that a cover which is substantially the same as the cover 101 is provided. The structure around the bearing sets 51 and 52 for the rotary shaft 35 is the same, respectively The lubricating oil 59 fed into the oil-gathering chamber 81 gathers on the cover 101 which closes the upper opening 42c of the upper bearing 42a. All of the lubricating oil 59 gathering on the cover 101 is prevented from entering directly the upper bearing 42a. The lubricating oil 59 gathering on the cover 101 tends to be moved toward the oil-escape passages 82 which is formed in the shaft support 28 and located around the bearing set 42. A part of the lubricating oil 59 enters the inside of the upper bearing 42a through the clearance between the cover 101 and the upper opening 42c of the upper bearing 42a thereby to lubricate and cool the upper and lower bearings 42a and 42b. The lubricating oil 59 flows out of the lower bearing 42b through its lower opening 42d and then downward in the oil-recovery passage 48. The rest of the lubricating oil 59, which has not entered the upper bearing 42a, flows into the oil-recovery passage 48 through the oil-escape passages 82 provided around the upper and lower bearings 42a and 42b. The lubricating oil 59 flowing downward in the oil-recovery passage 48 reaches the bearing set 43. The lubricating oil 59 flows, lubricates and cools the bearing set 43 in substantially the same manner as the lubricating oil 59 flowing through the bearing set 42.

According to the vacuum pump of the second preferred embodiment, the same advantageous effects as mentioned in the paragraphs (1), (2) and (4) through (6) are obtained. In addition, the following advantageous effect is obtained.

The covers 101 are fixedly fitted at its outer periphery 101a in the respective shaft supports 28 and 38, so that position accuracy of the covers 101 for the openings 42c, 43c, 51c and 52c is maintained successfully. Furthermore, since the cover 101 is not fixed to the rotary shaft 25, the number of elements attached to the rotary shaft 25 is reduced in comparison to the case where the cover is fixed to the rotary shaft, with the result that the force for driving the rotary shaft 25 is decreased.

Figure 5A:
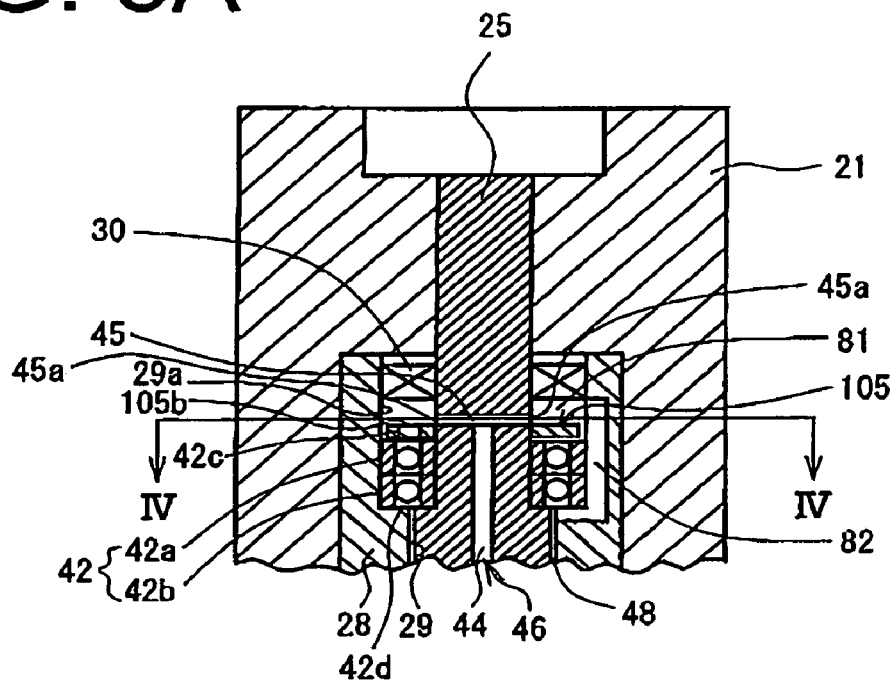
FIG. 5A is a partially enlarged cross-sectional view of a vacuum pump around a cover according to a third preferred embodiment of the present invention.

A vacuum pump according to a third preferred embodiment of the present invention will be described with reference to FIGS. 5A and 5B. In the third preferred embodiment, a lubrication hole is formed through the cover of the first preferred embodiment. In the third preferred embodiment, four covers are also provided above the bearing sets 42, 43, 51 and 52 which support the rotary shafts 25 and 35, respectively. Each of the covers is substantially the same structure. Thus, for the sake of convenience of explanation, like or same parts or elements are referred to by the same reference numerals as those which have been used in the first preferred embodiment, and the description thereof is omitted. Only the modified portions will be described.

Figure 5B:
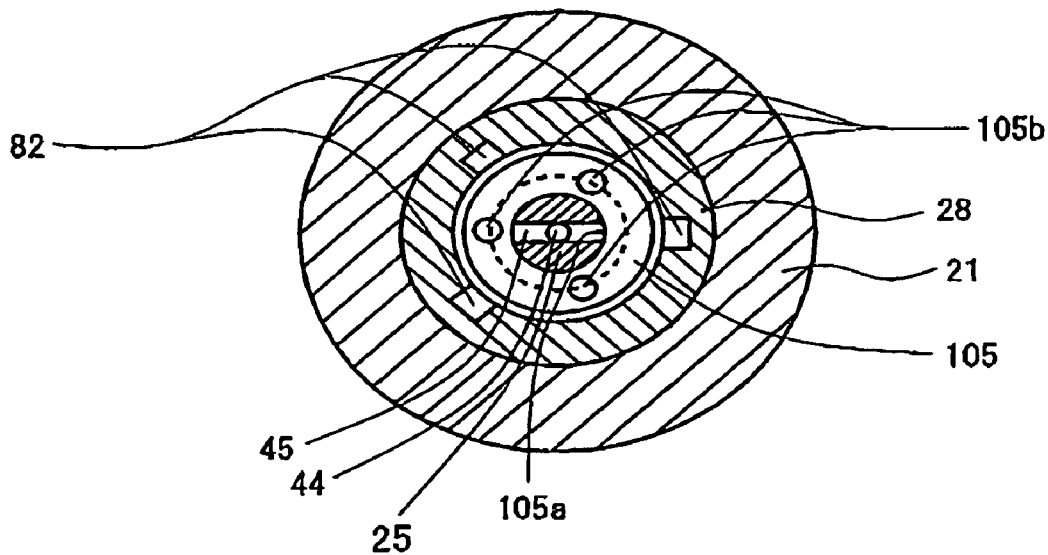
FIG. 5B is a cross-sectional view of the vacuum pump taken along the line IV-IV in FIG. 5A.

Referring to FIG. 5B, the cover 105 has a through hole 105a through which the rotary shaft 25 is inserted. The cover 105 is formed with three lubrication holes 105b through which the lubricating oil 59 is introduced into the upper bearing 42a. The lubrication holes 105b are located at positions corresponding to the upper opening 42c of the upper bearing 42a. In this case, in addition to the lubricating oil 59 entering the inside of the upper bearing 42a through the clearance between the cover 105 and the upper opening 42c of the upper bearing 42a, a part of the lubricating oil 59 enters directly the inside of the upper bearing 42a through the lubrication holes 105b. Thus, the amount of the lubricating oil 59 entering the inside of the upper bearing 42a is increased.

According to the vacuum pump of the third preferred embodiment, the same advantageous effects as mentioned in the paragraphs (1) through (3), (5) and (6) are obtained In addition the following advantageous effect is obtained.

Since a part of the lubricating oil 59 is introduced into the upper bearing 42a through the lubrication holes 105b of the cover 105, the amount of the lubricating oil 59 entering the inside of the upper bearing 42a is increased. The amount of the lubricating oil 59 entering the upper bearing 42a can be adjusted as required by changing the diameter and the number of the lubrication holes 105b.

The present invention is not limited to the embodiments described above but may be modified into alternative embodiments as exemplified below.

Figure 6A:
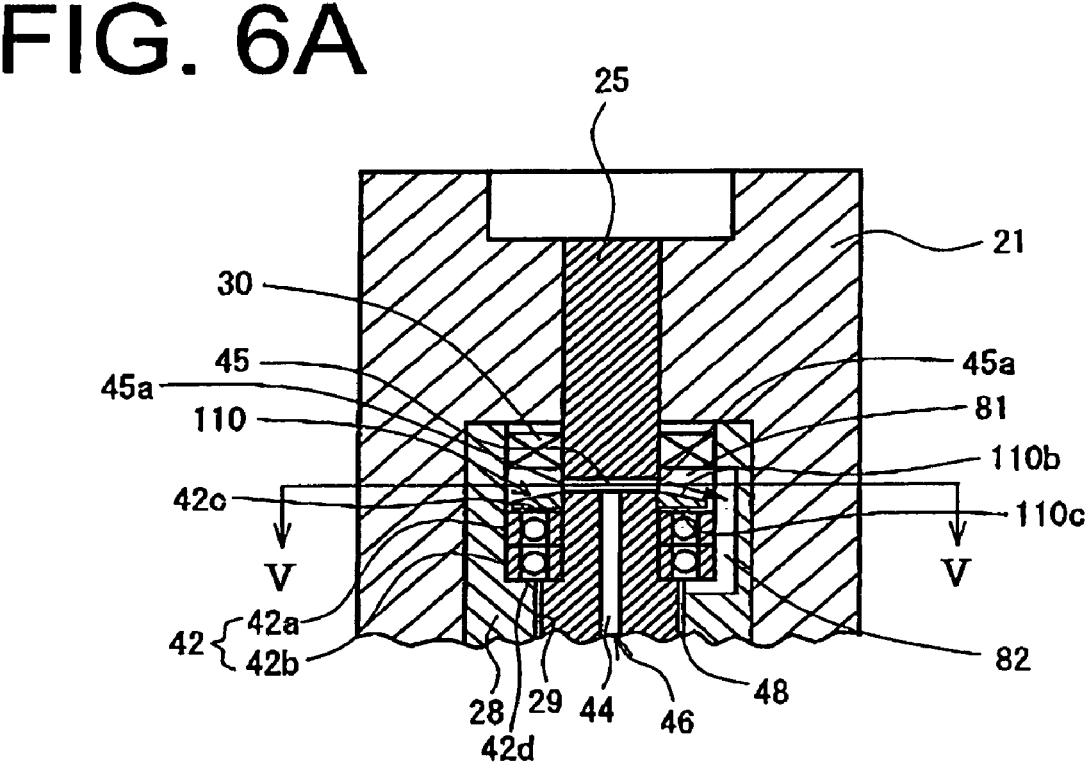
FIG. 6A is a partially enlarged cross-sectional view of a vacuum pump around a cover according to an alternative preferred embodiment of the present invention.
Figure 6B:
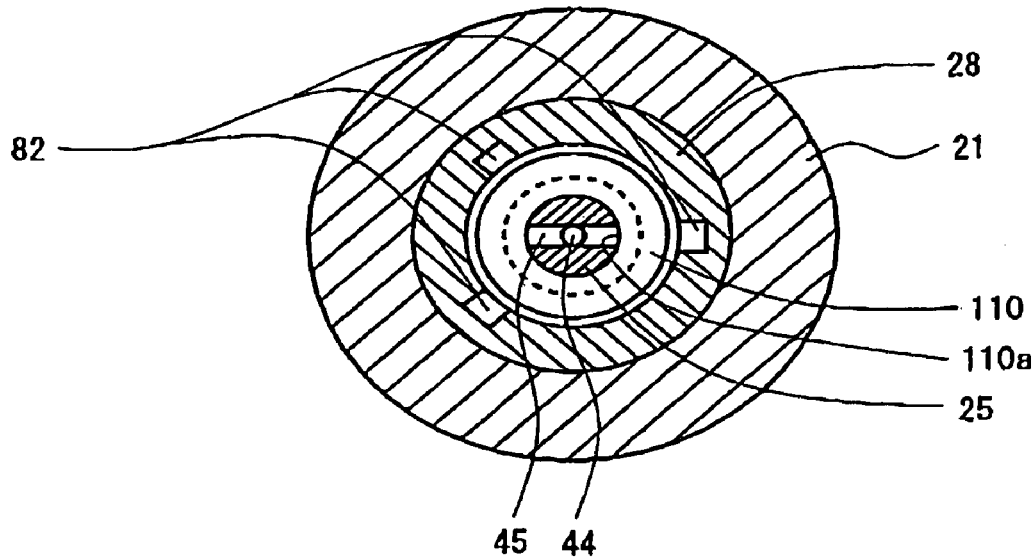
FIG. 6B is a cross-sectional view of the vacuum pump taken along the line V-V in FIG. 6A.

In the first and third preferred embodiments, the cover provided above the upper opening of the bearing is made of a plate and fixed to the rotary shaft. The vacuum pump of an alternate embodiment has a cover 110 which is conical in shape as shown in FIGS. 6A and 6B. The cover 110 has a through hole 110a at its center and is fixedly fitted on the rotary shaft 25. As shown in FIG. 6A, the cover 110 has an inclined surface 110b extending obliquely downward from its inner periphery toward its outer periphery. The cover 110 is located between the outlets 45a of the lateral passage 45 adjacent to the bearing set 42 and the upper opening 42c of the upper bearing 42a and has a flat bottom surface 110c with which the upper opening 42c of the upper bearing 42a is covered. According to such structure, the lubricating oil fed to above the upper bearing 42a through the oil-feed passage 46 is blocked by the cover 110 and is prevented from entering directly the upper bearing 42a. Since the cover 110 is rotatable with the rotary shaft 25 at a high speed, the lubricating oil on the cover 110 is scattered outwardly along the inclined surface 110b by the centrifugal force. At this time, the lubricating oil is scattered outwardly and downward as indicated by the arrow in FIG. 6A, so that the lubricating oil is immediately moved toward the oil-escape passages 82. Accordingly, the lubricating oil is prevented from splashing back to the oil-gathering chamber 81 by collision with the inner wall of the oil-escape passage 82.

In the first, second and third preferred embodiments, the cover is fitted on the rotary shaft or in the shaft support separately from the bearing for covering the opening of the bearing. Alternatively, the cover may be attached to the bearing. More specifically, the cover may be fixed to either of the inner ring and the outer ring of the bearing. Furthermore, the cover attached to the bearing may be formed with a lubrication hole through which the lubricating oil is introduced into the bearing.

In the first, second and third preferred embodiments the cover is disc-shaped. However, the shape of the cover is not limited to the disc shape but may be rectangular or any other polygonal shape. The cover may have any shape as long as it can cover or close the opening of the bearing.

In the first, second and third preferred embodiments, the covers are provided above all of the bearing sets which support the rotary shafts of the male and female rotors, respectively. Alternatively, the covers may be provided above the bearing sets which support the rotary shaft of either one of the male and female rotors The covers may be provided above either one of the bearing sets which support the rotary shaft of each rotor.

In the first, second and third preferred embodiments, the oil-feed passage is provided in the rotary shaft. Alternatively, the oil-feed passage may be provided in the shaft support.

In the first, second and third preferred embodiments, the oil-escape passages are formed in the shaft support. Alternatively, the oil-escape passage may be formed in the rotary shaft. The oil-escape passage may be formed in both of the rotary shaft and the bearing.

In the first, second and third preferred embodiments, the trochoid pump is used as the oil-feed pump. Alternatively, a pump of any other types such as a screw pump, a gear pump or the like may be used as the oil-feed pump.

In the first, second and third preferred embodiments, the oil-feed pump (or the trochoid pump) is connected to each end of the rotary shafts driven to rotate synchronously by the drive motor so that the oil-feed pump is driven by the rotary shafts. Alternatively, an oil-feed pump having a separate drive source may be provided for feeding the oil to each oil-feed passage.

The first, second and third preferred embodiments show the vacuum pump having the lead angle of the teeth and the tooth spaces of the rotors decreases progressively from the upper end toward the lower end in the axial direction. Alternatively, the vacuum pump may be of a type in which the lead angle of the teeth and the tooth spaces of the rotors is constant.

In the first, second and third preferred embodiments, each of the bearing sets consists of two single-row roller bearings. Alternatively, double-row roller bearings may be used in place of the single-row roller bearings. The number of the roller bearings provided at one location is not limited to two.

In the first, second and third preferred embodiments, the shaft supports for the male and female rotors are made of the integral unit. Alternatively, the shaft supports may be provided separately from each other. By so doing, manufacture of the shaft supports and assembling of the vacuum pump may be facilitated.

In the third preferred embodiment, the cover 105 has the three lubrication holes 105b. However, the number of the lubrication holes 105b is not limited to three but may be changed.

Therefore, the present examples and embodiments are to be considered as illustrative and not restrictive, and the invention is not to be limited to the details given herein but may be modified within the scope of the appended claims.

What is claimed is:

1. A vacuum pump comprising:
   a housing assembly having an oil-reservoir chamber in which a lubricating oil is stored;
   a pair of screw rotors disposed in the housing assembly and engaged with each other;
   a pair of rotary shafts connected to the rotors, respectively;
   a plurality of bearings supporting each of the rotary shafts and having an opening;
   an oil-feed pump for feeding the lubricating oil from the oil-reservoir chamber to the bearing;
   an oil-circulation passage provided for circulating the lubricating oil from the oil-feed pump to the oil-reservoir chamber through the bearing;
   a cover provided at the opening of the bearing to close the opening of the bearing with a clearance remained, the cover permitting the lubricating oil to enter the bearing through the clearance; and
   an oil-escape passage provided adjacent to the bearing for returning to the oil-reservoir chamber the lubricating oil not entering the bearing.

2. The vacuum pump according to claim 1, wherein the oil-escape passage is provided at position corresponding to an outer peripheral side of the bearing, the cover being fixed to the rotary shaft for rotation with the rotary shaft.

3. The vacuum pump according to claim 1, wherein the bearing is a ball bearing.

4. The vacuum pump according to claim 1, wherein the cover has a lubrication hole through which the lubricating oil is introduced into the bearing.

5. The vacuum pump according to claim 1, wherein the oil-circulation passage includes an oil-feed passage having an outlet adjacent to the bearing and an oil-recovery passage being in communication with the oil-escape passage.

6. The vacuum pump according to claim 5, wherein the oil-feed passage has an axial passage extending axially in the rotary shaft and a lateral passage extending in the rotary shaft perpendicularly to an axis of the rotary shaft for forming the outlet.

7. The vacuum pump according to claim 5, further comprising a shaft support provided in the housing assembly for supporting each of the rotary shafts, the oil-recovery passage being formed by a clearance between the rotary shaft and the shaft support.

8. The vacuum pump according to claim 5, wherein the oil-escape passage provides fluid communication between the oil-feed passage and the oil-recovery passage.

9. The vacuum pump according to claim 1, wherein the oil-feed pump is a trochoid pump provided at an end of the rotary shaft.

10. The vacuum pump according to claim 1, wherein the cover is disc-shaped.

11. The vacuum pump according to claim 1, wherein the cover is conical in shape.

* * * * *

UNITED STATES PATENT AND TRADEMARK OFFICE
CERTIFICATE OF CORRECTION

PATENT NO.         : 7,458,790 B2
APPLICATION NO.    : 11/591077
DATED              : December 2, 2008
INVENTOR(S)        : Shinya Yamamoto et al.

It is certified that error appears in the above-identified patent and that said Letters Patent is hereby corrected as shown below:

Column 1, line 7, please delete "for use in semiconductor manufacturing process." and insert therefore -- for use in a semiconductor manufacturing process. --;

Column 1, lines 55 and 56-57, please delete "oil-return hole 53" and insert therefore -- oil-return hole (53) --;

Column 2, line 51, please delete "taken along the line I-I in FIG. 3A;" and insert therefore -- taken along the line II-II in FIG. 3A; --;

Column 5, line 13, please delete "therein As the inner rotor 63" and insert therefore -- therein. As the inner rotor 63 --;

Column 6, line 16, please delete "shaft 25, 20 the upper bearing 43a, the inner wall" and insert therefore -- shaft 25, the upper bearing 43a, and the inner wall --;

Column 7, line 17, please delete "and lower 10 bearings 42a and 42b." and insert therefore -- and lower bearings 42a and 42b. --;

Column 7, line 43, please delete "Before collected in the oil-reservoir chamber 58," and insert therefore -- Before being collected in the oil-reservoir chamber 58, --;

Column 7, line 44, please delete "lubricating oil 59 may flows via the synchronous gear 47" and insert therefore -- lubricating oil 59 may flow via the synchronous gear 47 --;

Column 8, line 21, please delete "the upper beatings 42a and 51a" and insert therefore -- the upper bearings 42a and 51a --;

Column 8, line 34, please delete "inside of the upper beatings 43a and 52a" and insert therefore -- inside of the upper bearings 43a and 52a --;

Column 8, lines 41-42, please delete "rotary shafts 25 and 35 at high a speed," and insert therefore -- rotary shafts 25 and 35 at a high speed, --;

Column 8, line 56, please delete "and the upper bearing 42a. 43a, 51a" and insert therefore -- and the upper bearing 42a, 43a, 51a --;

Column 8, line 65, please delete "male and female rotors 22 and 31," and insert therefore -- male and female rotors 21 and 31, --;

UNITED STATES PATENT AND TRADEMARK OFFICE
CERTIFICATE OF CORRECTION

PATENT NO.         : 7,458,790 B2
APPLICATION NO.    : 11/591077
DATED              : December 2, 2008
INVENTOR(S)        : Shinya Yamamoto et al.

It is certified that error appears in the above-identified patent and that said Letters Patent is hereby corrected as shown below:

Column 9, line 52, please delete "82 which is formed in the shaft support 28" and insert therefore -- 82 which are formed in the shaft support 28 --;

Column 10, line 5, please delete "The covers 101 are fixedly fitted at its outer periphery 101a" and insert therefore -- The covers 101 are fixedly fitted at their outer periphery 101a --;

Column 10, lines 41-42, please delete "and (6) are obtained In addition" and insert therefore -- and (6) are obtained. In addition --;

Column 11, line 32, please delete "male and female rotors The covers" and insert therefore -- male and female rotors. The covers --; and Column 11, line 45, please delete "pump of any other types" and insert therefore -- pump of any other type --.

Signed and Sealed this

Thirteenth Day of October, 2009

David J. Kappos
*Director of the United States Patent and Trademark Office*